Patented Feb. 16, 1954

2,669,587

UNITED STATES PATENT OFFICE 2,669,587

PROCESS OF MAKING BIS(BETA CHLORETHYL) SULFIDE

George E. Miller, Edgewood Arsenal, Edgar M. Faber, Baltimore, and Arthur M. Reeves, Havre de Grace, Md., assignors to the United States of America as represented by the Secretary of War No Drawing. Application June 19, 1937,
Serial No. 149,238

6 Claims. (Cl. 260—609)

(Granted under Title 35, U. S. Code (1952),
sec. 266)

The invention described herein may be manufactured and used by or for the Government for governmental purposes, without the payment to them of any royalty thereon.

This invention relates to an improved process for the manufacture of bis (beta chlorethyl) sulfide commonly known as mustard gas.

Mustard gas, which is

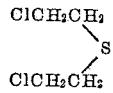

was used during the World War as a war gas, and was manufactured for the German army by reacting ethylene chlorhydrin with sodium sulfide, with subsequent treatment with hydrochloric acid. Later developments showed that mustard gas could be produced by the action of ethylene upon sulfur monochloride.

The Levinstein process for mustard gas manufacture consists essentially in bringing together sulfur mono-chloride and very pure ethylene gas in the presence of crude mustard gas as a solvent at a temperature ranging from 30–35° C. A supply of unchanged mono-chloride is constantly maintained in the reacting liquid until a sufficiently large batch is built up. Then the sulfur mono-chloride feed is discontinued and the ethylene feed continued until further absorption ceases. During the reaction the charge is mechanically agitated.

This Levinstein process is accompanied by a deposition of sulfur in the reactor, pipe lines and valves, causing serious clogging. Since a certain amount of mustard gas remains with this sulfur, the removal of the sulfur is accompanied by hazards to the personnel.

The principal object of this invention is to develop an efficient continuous process for the manufacture of bis (beta chlorethyl) sulfide in quantity production.

Another object of this invention is to develop a process for the manufacture of bis (beta chlorethyl) sulfide in which the difficulties occasioned by the deposition of sulfur in the pipes and valves are materially reduced.

Another object of this invention is to develop a process for the manufacture of bis (beta chlorethyl) sulfide from ethylene and sulfur dichloride which eliminates the strong tendency of sulfur dichloride to chlorinate the mustard gas in the reaction chamber.

These and other objects of the invention will be apparent from the following description and claims, it being understood that the invention is not limited to the precise details herein set forth by way of illustration.

Theoretically, the formation of bis (beta chlorethyl) sulfide from ethylene and sulfur dichloride is the ideal method. However, the strong tendency of the sulfur dichloride to chlorinate the mustard gas had not been overcome prior to our invention. These reactions may be expressed by the following equations:

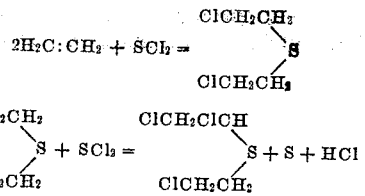

Prior to the present invention, sulfur dichloride containing one per cent of absorbent charcoal had been treated with dry ethylene. However, the yield was only about 50% mustard gas which was also very impure. Another method tried was to spray ethylene with mixtures of sulfur dichloride and sulfur monochloride into a globular flask at atmospheric pressure. The mustard gas thus obtained contained a large percentage of $S_2Cl_2$ which will gradually chlorinate the mustard gas.

According to the present invention the reaction of sulfur dichloride and ethylene is carried out under pressure with an excess of ethylene. Due to the increase in pressure, the concentration of ethylene is increased, with a resultant increase in the rapidity of the reaction and a decrease in the chlorination of the mustard gas by unreacted sulfur dichloride. It has been found that pressures of the order of 40 to 75 pounds or upward, per square inch in the reaction chamber may be used satisfactorily. In a number of runs, a pressure of about 50 pounds per square inch has been used with good results. Generally the reaction is more rapid and there is less chlorination of the mustard gas as the pressure is raised.

In order to get a rapid and intimate mixture of the $SCl_2$ and ethylene, the spray method is used and preferably the sulfur dichloride is sprayed into an atmosphere of ethylene. One specific example of our process is as follows: A lead-lined reactor is filled with ethylene maintained at a pressure of 50 pounds per square inch. Sulfur dichloride is sprayed into the reactor and the resultant mustard gas is withdrawn.

By the above method, a yield of about 92% mustard gas having a purity of about 85% may be obtained. The temperature in the reaction chamber is generally from 50° to 80° C.

For quantity production, the reactor will be continuously supplied with ethylene to maintain the pressure thereof, and means will be provided to continuously withdraw the liquefied gas.

The invention herein described is not limited to the precise details herein disclosed, since variations therein may be made by those skilled in the art without exceeding the scope of the appended claims.

We claim:

1. The process of making bis (beta chlorethyl) sulfide which comprises intimately contacting sulfur dichloride and ethylene at a pressure of from about 40 pounds to about 75 pounds per square inch.

2. The process of making bis (beta chlorethyl) sulfide which comprises intimately contacting sulfur dichloride and ethylene by spraying under a pressure of from about 40 pounds to about 75 pounds per square inch.

3. The process of making bis (beta chlorethyl) sulfide which comprises maintaining an excess of ethylene under pressure, and introducing therein and intimately contacting therewith sulfur dichloride at pressure of from about 40 pounds to about 75 pounds per square inch.

4. The process of making bis (beta chlorethyl) sulfide which comprises maintaining an excess of ethylene under a pressure of from about 40 pounds to about 60 pounds per square inch and spraying sulfur dichloride thereinto.

5. The process of making bis (beta chlorethyl) sulfide which comprises spraying sulfur dichloride into ethylene maintained at a pressure of substantially 50 pounds per square inch.

6. The process of making bis (beta chlorethyl) sulfide which comprises spraying sulphur dichloride into ethylene maintained under a pressure of from about 40 pounds to about 75 pounds per square inch, maintaining a reaction temperature of from about 50° C. to about 80° C., continuously supplying additional ethylene to maintain the pressure, and withdrawing the liquefied bis (beta chlorethyl) sulfide.

GEORGE E. MILLER.
EDGAR M. FABER.
ARTHUR M. REEVES.

References Cited in the file of this patent

FOREIGN PATENTS

| Number | Country | Date |
|---|---|---|
| 142,875 | Great Britain | June 10, 1920 |
| 504,814 | France | July 17, 1920 |

OTHER REFERENCES

"Journal Soc. Chem. Ind." vol. 39, page 65. (Copy in Patent Office Library.)

"Chem. Reviews," vol. 15 pages 426–62. (Copy in Patent Office Library.)